N. L. OLSON.
TRACTOR ATTACHMENT FOR AUTOMOBILES.
APPLICATION FILED JULY 26, 1915.

1,285,342.

Patented Nov. 19, 1918
3 SHEETS—SHEET 1.

Witnesses
Bernard A. Penhack
Arthur F. Draper

Inventor
Nels. L. Olson
By
Attorneys

N. L. OLSON.
TRACTOR ATTACHMENT FOR AUTOMOBILES.
APPLICATION FILED JULY 26, 1915.

1,285,342.

Patented Nov. 19, 1918.
3 SHEETS—SHEET 2.

Inventor
NELS L. OLSON

Witnesses
Bernard A. Penhack
Arthur F. Draper

By
Attorneys

N. L. OLSON.
TRACTOR ATTACHMENT FOR AUTOMOBILES.
APPLICATION FILED JULY 26, 1915.

1,285,342.

Patented Nov. 19, 1918.
3 SHEETS—SHEET 3.

Witnesses
Bernard A. Penhack
Arthur F. Draper

Inventor
NELS. L. OLSON

By
Attorneys

UNITED STATES PATENT OFFICE.

NELS L. OLSON, OF DETROIT, MICHIGAN.

TRACTOR ATTACHMENT FOR AUTOMOBILES.

1,285,342.     Specification of Letters Patent.     Patented Nov. 19, 1918.

Application filed July 26, 1915. Serial No. 41,862.

*To all whom it may concern:*

Be it known that I, NELS L. OLSON, a citizen of the United States of America, residing at Detroit, in the county of Wayne and State of Michigan, have invented certain new and useful Improvements in Tractor Attachments for Automobiles, of which the following is a specification, reference being had therein to the accompanying drawings.

This invention relates to automobiles and to an attachment therefor whereby an ordinary road car may be quickly converted into a truck or tractor, the device being particularly adaptable for use with a well known type of light car.

One of the objects of the invention is to provide means whereby the necessary power for use in handling a heavy load may be obtained and whereby the ordinary spring suspension of the vehicle is unaltered and is utilized to act as an auxiliary support in case of momentary overload or depression of the attachment spring supporting devices.

The invention consists in the matters hereinafter set forth and more particularly pointed out in the appended claims.

Referring to the drawings.

Figure 1:
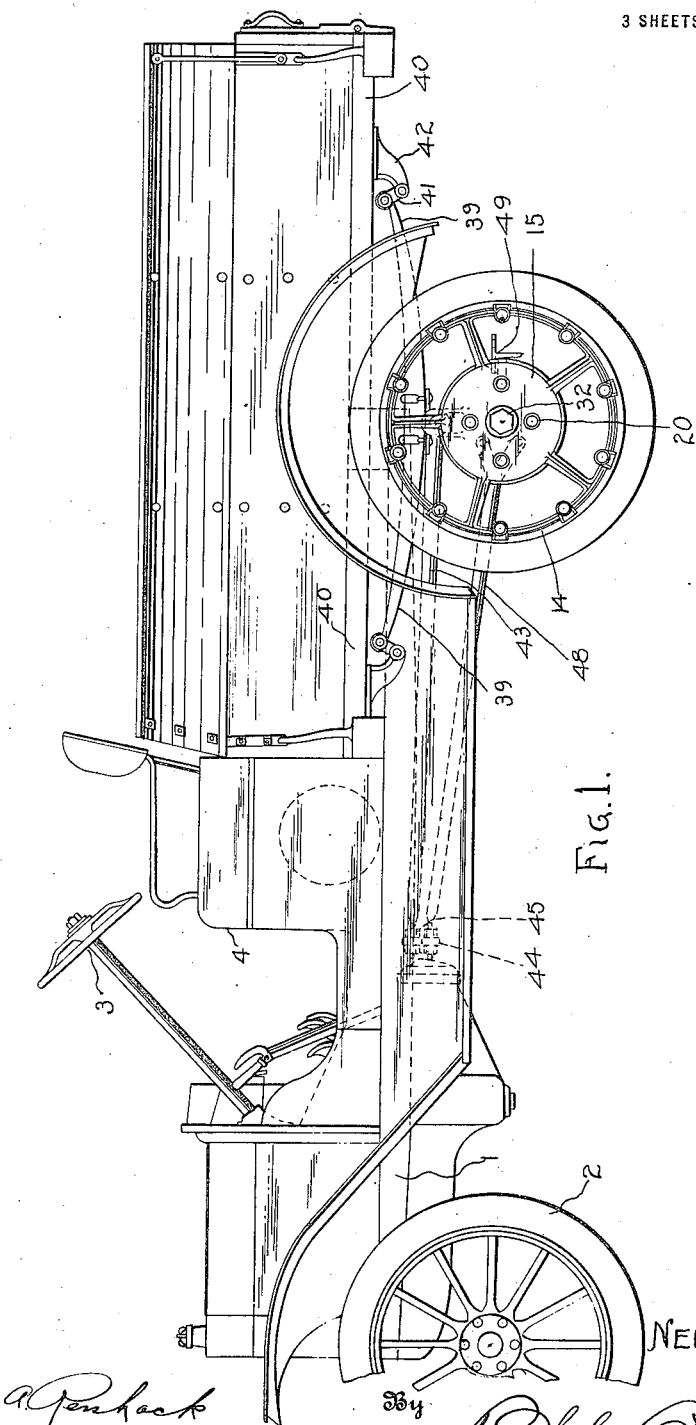
Figure 1 is a view in side elevation of a motor vehicle equipped with an attachment that embodies features of the invention.
Figure 2:
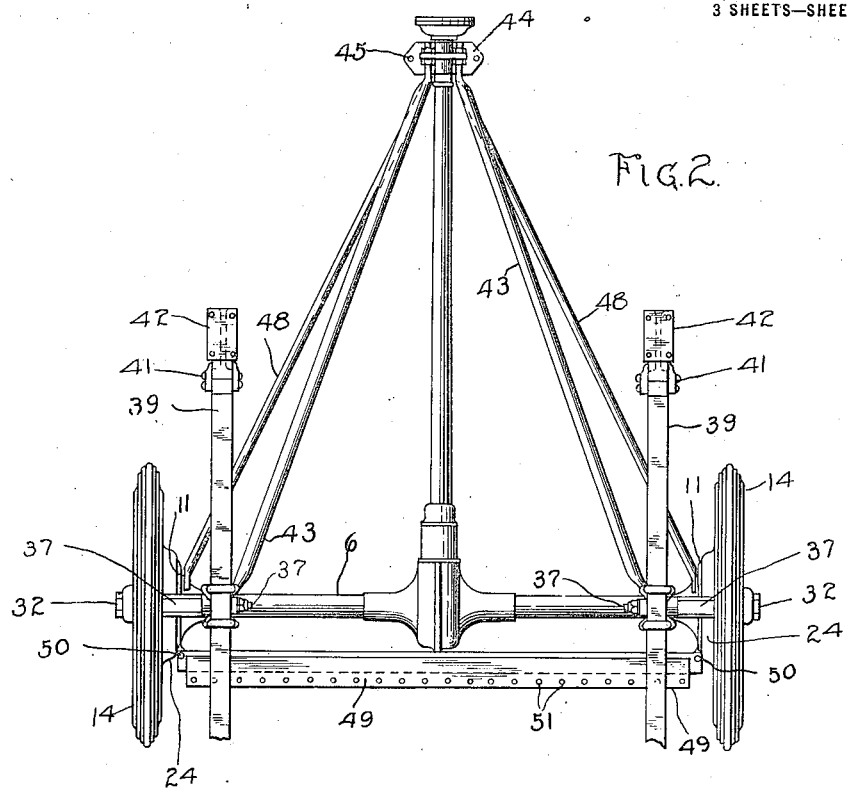
Fig. 2 is a plan view in detail of the rear portion of the chassis, the traction bearing wheels and the attachment spring support.
Figure 3:
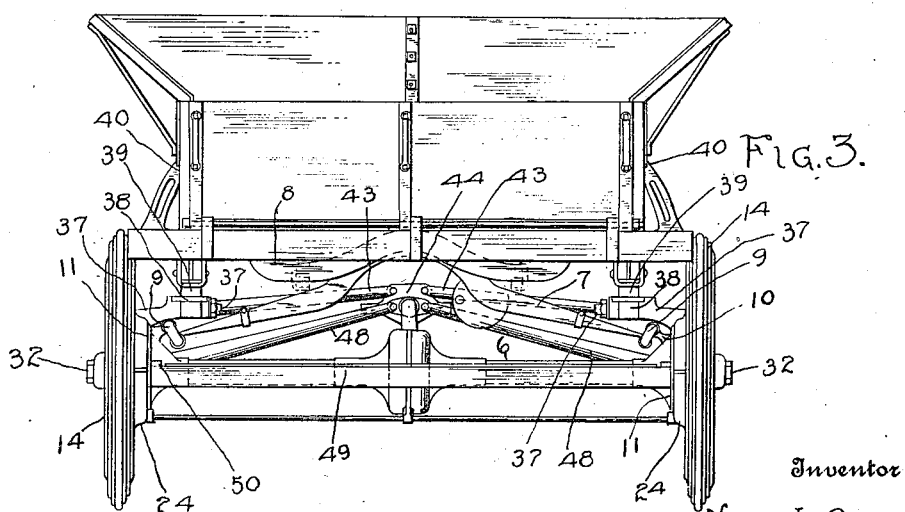
Fig. 3 is a view in detail and in rear elevation of a car equipped with the attachment.
Figure 4:
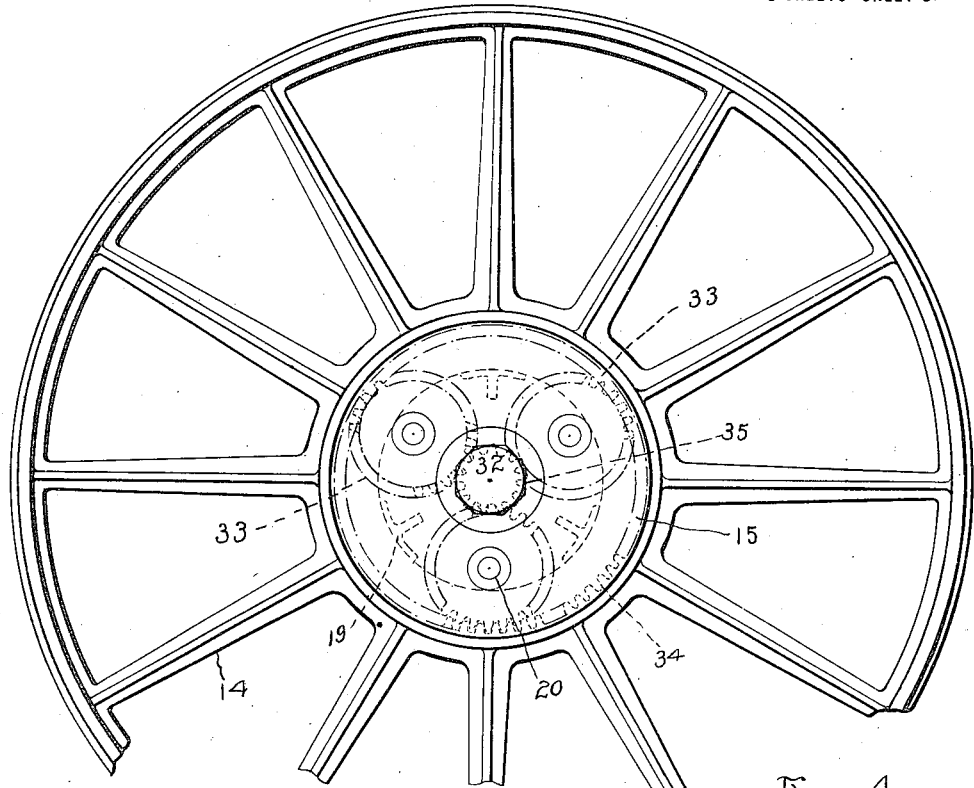
Figs. 4 and 5 are views in detail of a traction bearing wheel with a reducing gear, assembled and mounted on the rear axle.
Figure 5:
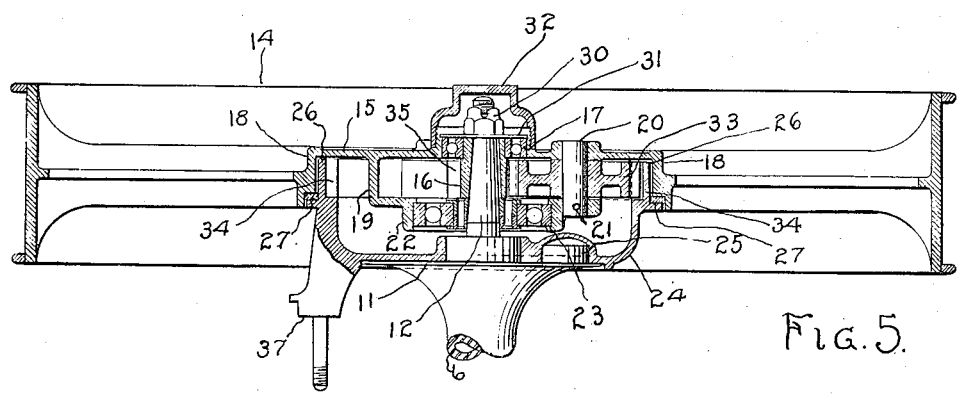

Referring to the drawings a chassis 1 of a standard or conventional type of construction of a standard light road car is supported at the forward end by suitable spring members on suitable guide bearing wheels 2 and is equipped with the customary steering means indicated generally at 3 and with a forward seat 4. The rear portion of the chassis is supported on a tubular rear axle housing 6 by a transversely disposed elliptical spring 7 clipped at the crown center by suitable means to a cross member 8 of the chassis and coupled by a pair of shackles 9 at the ends to suitable lugs 10 formed on the enlarged end portions 11 of the rear axle. A two-part differential axle through which power is communicated in the manner of the standard shaft drive transmission, which does not form a part *per se* of this invention and is therefore not herein described or claimed, has skein end portions 12 for the attachment of the regular traction bearing wheels of the car when used for road purposes, such wheels not being shown here as they are of the usual type.

Traction bearing wheels 14 having appropriate tread surfaces, are each connected to the skein portion 12 of the differential shaft through the medium of a reduction gear train of the planetary type housed in a suitable casing 15 which forms the nave of the wheel. A hollow hub sleeve 16 is keyed or otherwise made fast to the skein 12 and supports an appropriate anti-friction bearing, herein shown at 17 of conventional ball type, on which the casing 15 is rotatably mounted. An exterior annular flange 18 of the latter carries the spokes and rim of the wheel while an inner interrupted flange 19 whose sections are appropriately ribbed and flanged to combine strength and lightness, aids in supporting planetary pinion studs 20 that are secured removably, as by means of pins 21, and symmetrically around the skein or journal 12 in the casing 15. An inner rim flange 22 formed on the flange 19 carries an inner anti-friction bearing, such as of the ball type indicated at 23, that is appropriately arranged to transmit the weight to the skein portion 12. A stationary section 24 of the wheel casing is appropriately secured to the end portions 11 of the axle housing 6 by any preferred means, and as herein shown, advantage may be taken of a projection 25 on the flange of the part 11, to lock the parts together. A rabbeted rim 26 on the section 24 rotates in the rim 18, the shoulder of the rabbet coöperating with a corresponding rabbet shoulder on the rim 18 to retain a thrust ring 27 of appropriate design and material. A retaining nut 30, washer 31 and dust cap 32 complete the exterior structure of the wheel nave.

Planetary pinions 33 on the studs 20 mesh with an internal gear or gear ring 34 secured to or formed on the rim 26 of the fixed section 24 and at the same time are driven by a gear 35 formed on or secured to the hub sleeve 16. By the proper proportioning of these intermeshing pinions and gears, the wheel is driven at a reduced speed from the differential shaft speed and thereby the purchase power is increased.

Bearing studs 37 mounted on or secured to the stationary section 24 of the traction wheel nave each afford support for a spring perch block 38 to which a semi-elliptical spring 39 is appropriately clipped. A truck body 40 is suspended as by shackles 41 and hangers 42 on the spring 39, the forward portion of the body being appropriately latched, or otherwise detachably secured to the main chassis frame so as to be tiltable if desired.

Suitable brace rods 43 converge forwardly into a fitting 44 to which they are appropriately connected, the latter being removably secured as by bolts 45 or the like to the torque tube of the axle at a point substantially coincident with the point of attachment of the main radius rods 48 of the machine. As herein shown the fitting grips the tube and bridges over the radius rods.

When used as a tractor, an equalizer member or bar 49 is detachably secured by bolts 50 or the like to the stationary sections 24 of the traction wheel nave and is provided with a series of apertures 51 for attachment of a vehicle or agricultural machine.

The supporting springs of the truck body may be so proportioned that before a maximum load is reached, the weight on the body is carried by the semi-elliptic springs above and clear from the main springs 7 of the car chassis.

As a result of this construction the load of the truck body is not transmitted to the chassis except when near a maximum or when passing over rough roads, the wheels and axle of the chassis being free to tilt in the ordinary manner and the springs of the chassis operating only as reinforcing or auxiliary springs. The excess load is transferred directly to the wheels while the brace rods directly couple the truck body to the torque tube at a point substantially coincident with the connection of the tube to the chassis. Thus neither the weight nor the driving strains due to the inertia of the truck body and its momentum, affect the chassis. The transfer from the regular gear to the attachment gear is quickly made, and the car is thus able to serve either as a roadster or as a truck or tractor.

Obviously, changes in the details of construction may be made without departing from the spirit of my invention and I do not care to limit myself to any particular form or arrangement of parts.

What I claim is:—

1. An attachment for vehicles having an axle provided with flanges, comprising a spring supporting member having a face portion arranged for attachment to an axle flange, a spring parallel to the face portion of said member, and means for securing said spring to said member.

2. An attachment for vehicles having an axle provided with end flanges, comprising spring supporting members each having a face portion for attachment to an axle flange and a laterally extending portion, springs extending parallel to said face portions, and means for securing said springs to said laterally extending portions.

3. An attachment for self-propelled vehicles comprising traction wheels adapted to be detachably secured to a differential drive shaft having a flanged housing, and a fitting adapted to be rigidly secured to an end flange of the housing of the said shaft and provided with means for supporting a load carrying body.

4. An attachment for self propelled vehicles comprising traction wheels adapted to be detachably secured to a differential shaft, members adapted to be secured to the ends of a housing for the differential shaft and forming closures for the wheel casings, and load carrying means on said members.

5. An attachment for motor vehicles including traction wheels adapted to be detachably secured to a differential axle and each having a casing part at the nave of the wheel, members adapted to be rigidly secured to the ends of a housing for the differential axle and to form fixed casing parts at the naves of the wheels, said members having portions projecting into the casing parts on the wheels, and load supporting means on each member projecting laterally therefrom.

6. An attachment for motor vehicles including traction wheels adapted to be detachably secured to a differential axle and each having a casing part in the nave of the wheel, members having faces adapted to be rigidly secured to the ends of a housing for the differential axle and to form fixed parts for closing one side of said casing, spring supports on said members, springs on said supports extending parallel with the face of said members, and load carrying bearings in the wheel casings.

7. An attachment for motor vehicles including traction wheels adapted to be detachably secured to the ends of a live axle, load carrying members adapted to be detachably secured to the ends of a fixed housing for said axle, springs supported by said members, and a load carrying body supported by said springs independently of said housing and the weight of which load is transmitted by said springs directly to the naves of the wheels.

8. The combination with a vehicle chassis, of an attachment including detachable traction wheels, load carrying members forming fixed parts of the wheel naves to transmit the load directly thereto and detachably secured to the chassis, against turning with the wheels, and a load carrying body carried by said members.

9. The combination with a chassis including a flanged axle housing, of an attachment including traction wheels having nave casings, a body, load carrying members supporting the body and forming fixed parts of said casings and detachably secured to the flange of said housing to transmit the load directly to the wheel naves, and means in said housings and wheel casings for driving the wheels.

10. The combination with a chassis including an axle housing and a differential axle in said housing, of an attachment including traction wheels detachably connected to said axle beyond the ends of said housing, said wheels each having an integral nave casing part, load carrying members detachably secured to the ends of said housing and forming fixed parts of said wheel casings, spring supporting means on each member projecting laterally therefrom in the direction of the length of said housing, springs on said means extending transversely of said housing parallel with the plane of rotation of said wheels, and means in each wheel casing for driving the wheels.

11. The combination with a chassis including an axle, of an attachment including traction wheels detachably connected to said axle, members each forming a fixed part of the nave of each wheel and detachably secured to the chassis, a spring support projecting laterally from each member in the direction of the length of said axle, springs pivotally attached to said supports, a load carrying body on the springs, and means in each wheel nave for transmitting motion from the axle to the wheels to drive the same.

12. An attachment for an automobile comprising traction bearing wheels having reduction gearing in the naves thereof together with stationary sections housing and anchoring the gearing adapted to be secured to the rear axle of an automobile, a truck body and means on the stationary sections for supporting the truck body independently of and above the chassis.

13. An attachment for an automobile comprising the combination with the rear driving axle thereof and the standard chassis yieldingly mounted on the axle, of traction bearing wheels having reduction gearing in the naves thereof including stationary sections adapted to be secured to the rear axle housing, body supporting members on the stationary sections and a truck body mounted thereon independently of and above the chassis.

14. An attachment for an automobile comprising traction bearing wheels each having reduction transmission in the nave thereof including a stationary section adapted to be secured to the stationary part of the rear axle of an automobile, spring perches on the sections, springs on the perches and a truck body mounted on the springs above and independent of the main body.

15. An attachment for an automobile comprising traction bearing wheels having reduction transmission in the naves thereof including a stationary section adapted to be secured to the stationary part of the rear axle of an automobile, spring perches on the sections, springs on the perches, a truck body mounted on the springs above and independent of the main body, and brace members extending forwardly from the spring perches and connecting with the forward portion of the chassis.

16. An attachment for an automobile comprising traction bearing wheels each having a two-part nave forming a housing for reduction gearing therein, and with a stationary section adapted to be secured to the housing of the main drive axle, body supporting members on the stationary sections, a truck body tiltably mounted on the supports above and independently of the main chassis, and means extending forward from the point of the support of the truck body as radius rods.

17. The combination with the rear drive axle of an automobile and a chassis yieldingly mounted thereon, of traction bearing wheels having reduction gearing in their naves including stationary sections adapted to be secured to the housing of the rear axle and provided with body supporting members and a truck body mounted thereon independently of the chassis.

18. The combination with a rear axle including a stationary housing and drive shaft thereof and a chassis yieldingly mounted thereon, of traction bearing wheels each including in the nave thereof a stationary section adapted to be secured to the rear axle housing and provided with supporting perches, and rotatable sections with intermediate gears between the sections for driving the rotatable members from the drive shaft, a truck body, and means supporting the body on the stationary sections above and independently of the automobile chassis.

In testimony whereof I affix my signature in presence of two witnesses:

NELS L. OLSON.

Witnesses:
LEWIS E. FLANDERS,
OTTO F. BARTHEL.